July 19, 1938.  A. C. PARLINI  2,124,468
PHOTOGRAPHIC CAMERA AND FOCUSING MEANS THEREFOR
Filed May 11, 1936  3 Sheets-Sheet 1
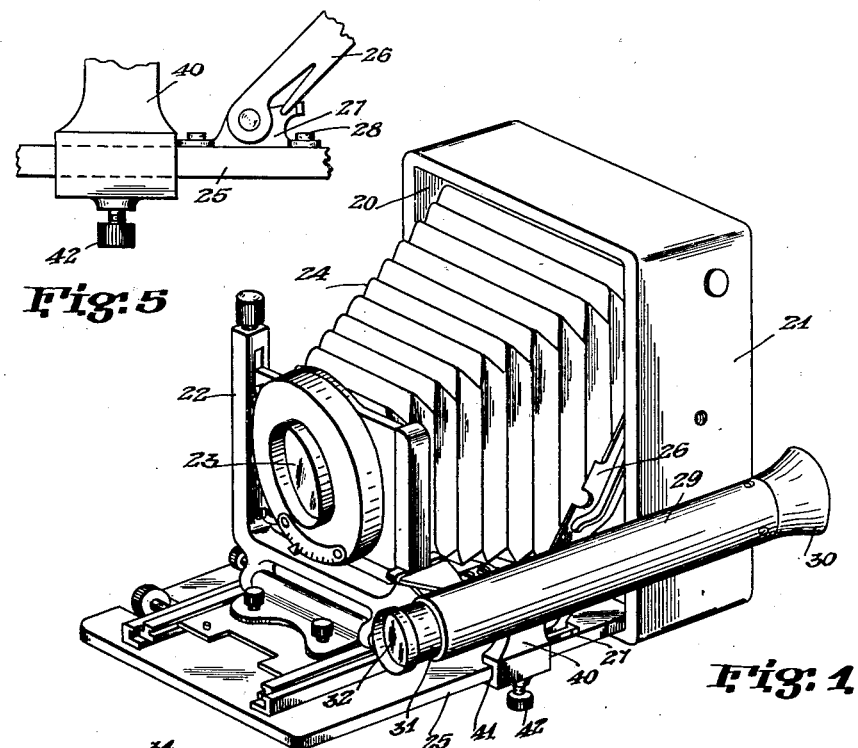
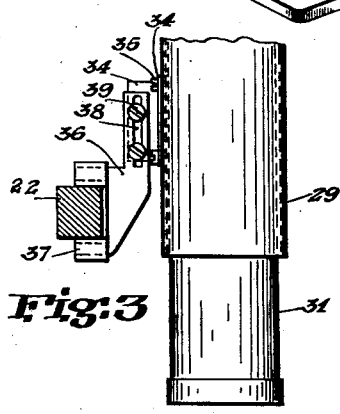
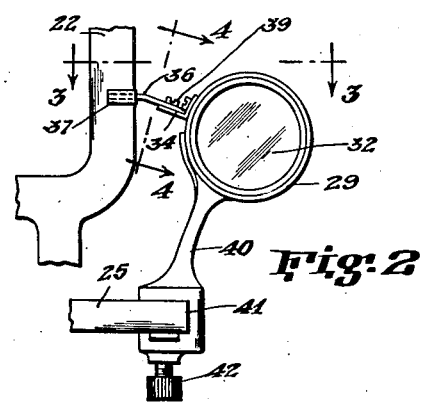
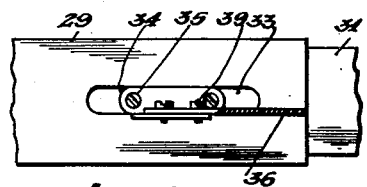
INVENTOR
Alexander C. Parlini
BY
ATTORNEY July 19, 1938.  A. C. PARLINI  2,124,468
PHOTOGRAPHIC CAMERA AND FOCUSING MEANS THEREFOR
Filed May 11, 1936  3 Sheets-Sheet 2
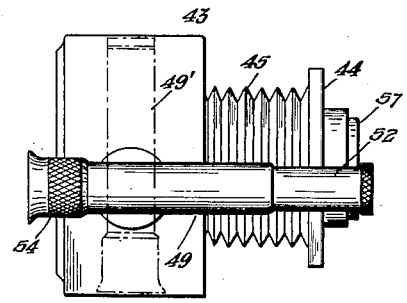
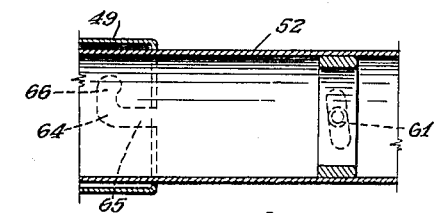
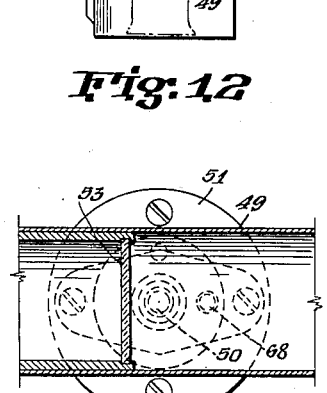
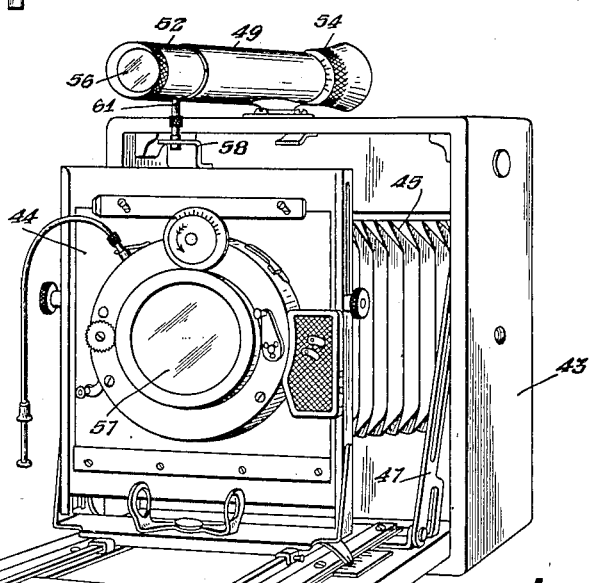
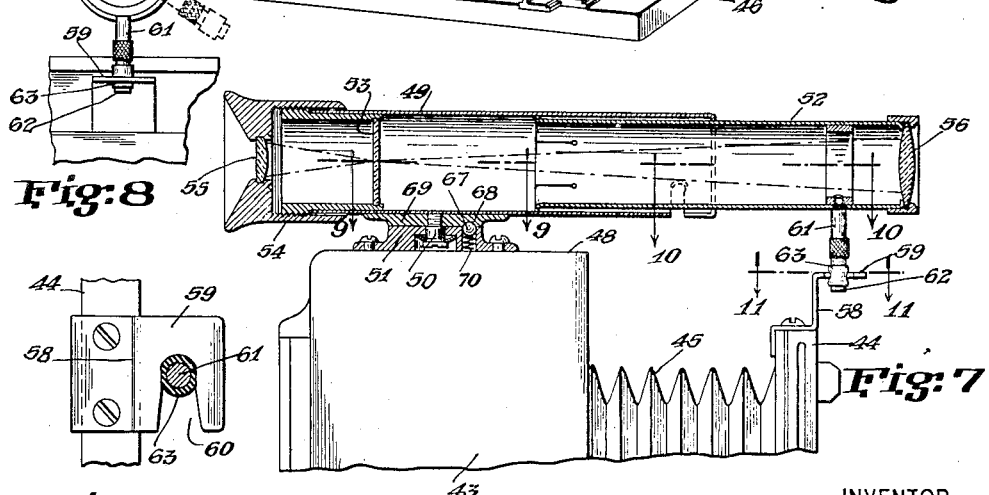
INVENTOR
Alexander C. Parlini
BY
ATTORNEY July 19, 1938.  A. C. PARLINI  2,124,468
PHOTOGRAPHIC CAMERA AND FOCUSING MEANS THEREFOR
Filed May 11, 1936  3 Sheets-Sheet 3
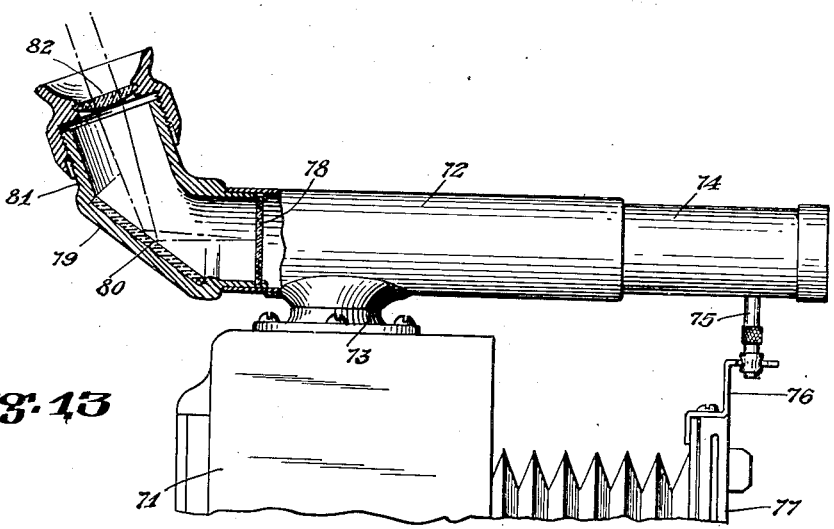
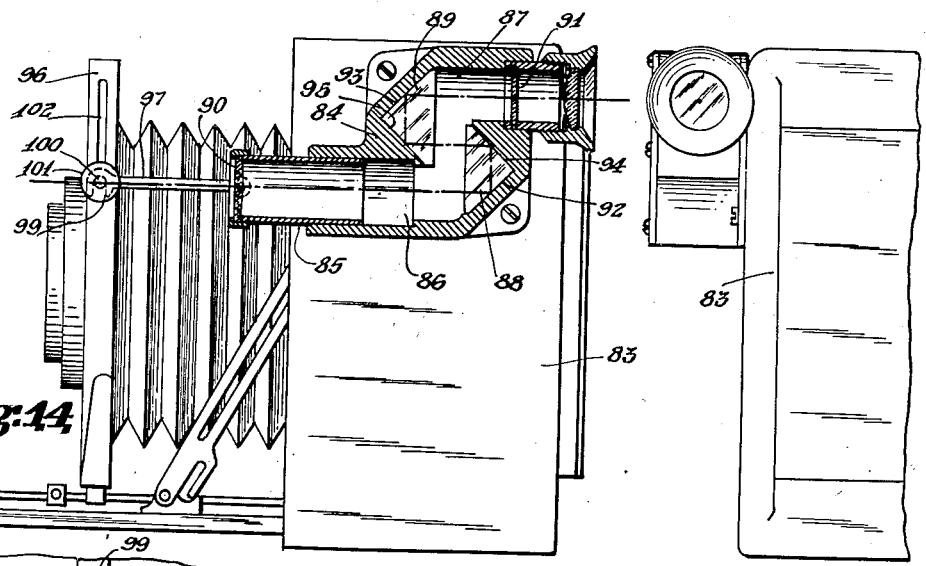
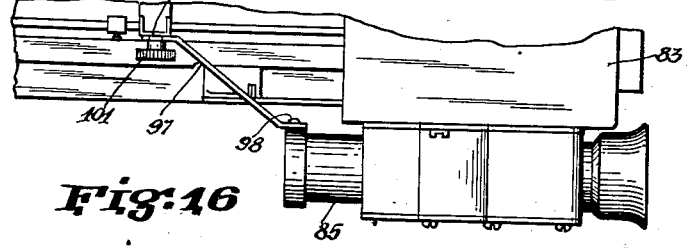
INVENTOR
Alexander C. Parlini
BY
ATTORNEY Patented July 19, 1938

2,124,468

UNITED STATES PATENT OFFICE 2,124,468

PHOTOGRAPHIC CAMERA AND FOCUSING MEANS THEREFOR

Alexander C. Parlini, Woodside, N. Y.

Application May 11, 1936, Serial No. 79,009

5 Claims. (Cl. 95—44)

This invention relates to photographic apparatus and more particularly refers to improvements in photographic cameras of the extensible type, and focusing devices therefor.

It is well known that while in the more popular and less expensive types of cameras, having a fixed focus, it is usually sufficient to focus the lens in accordance with a distance from the subject which is only estimated, and to use the finder for determining the limits of the subject on the plate, in the higher grade cameras where relatively large diameter lenses, having a relatively short depth of focus are used, considerably greater care is needed in focusing in order to achieve a sharp image.

Practically all high-grade cameras are therefore adjusted to proper focus with the help of a ground glass plate constituting the so-called focusing screen, before a picture is actually taken.

In most high-grade cameras where the focusing screen occupies the exact place which will be subsequently occupied by the sensitive plate, it becomes necessary to remove the focusing screen and to insert the plate holder in its place and then to remove the slide covering the plate before the picture can be taken. This results in a loss of time which may not be very serious in connection with studio work, but which is quite objectionable in connection with press work. Cameras used for press work are fitted with very rapid lenses, f/4.5 being the usual aperture. Speed is of course an essential in press work and therefore any improvement which tends to shorten the time required by the preparatory period preceding the actual taking of a picture is highly desirable.

My invention provides a separate focusing device which may be mounted on an ordinary camera and which permits of the sensitized element being kept ready within the camera for use at the very instant when it is needed.

Irrespective of its time saving character, my invention can also be used to advantage as an addition to an ordinary camera where the lens carrying frame is movable to and from the plate carrying frame, in that by its use correct focusing will be assured in all cases.

The primary object of my invention is to provide a focusing device, adapted to be mounted on an ordinary camera of the extensible type, in order to increase the efficiency of the camera both as to speed and clarity of results.

Another object is to provide a focusing device of the character specified, adapted to be made in the form of an attachment which may be detachably mounted on a camera whenever desired and which may be removed therefrom when the camera is not in use.

A further object is to provide a focusing device of a simple and compact construction, adapted for attachment to an ordinary camera, said attachment being easily applied in position and adapted for use without interfering with the normal operation of the camera.

A still further object is to provide a photographic camera of the extensible type equipped with a separate focusing device forming with the camera a compact and unobtrusive structure easy to use and easy to carry.

Other objects and advantages of the present invention will more fully appear as the description proceeds and will be set forth in the appended claims.

My invention is illustrated by way of example in the accompanying drawings, in which:

Fig. 1 is a view in perspective of a camera of the extensible type equipped with a device embodying one of the forms of my invention;

Fig. 2 is a fragmentary front view of the focusing device and connecting parts therefor in an enlarged scale;

Fig. 3 is a fragmentary horizontal section through line 3—3 of Fig. 2;

Fig. 4 is a fragmentary section slightly inclined to the vertical, taken along the line 4—4 of Fig. 2;

Fig. 5 is a fragmentary side elevation showing the manner of mounting the bracket supporting the focusing device onto the platform supporting the lens carrying frame;

Fig. 6 is a view in perspective of another camera of the extensible type equipped with a device embodying another form of my invention;

Fig. 7 is a fragmentary vertical section in an enlarged scale of the focusing device and camera shown in Fig. 6;

Fig. 8 is a detail front view in elevation illustrating two different angular positions of the extensible member of the focusing device shown in Figs. 6–11;

Fig. 9 is a fragmentary horizontal section in an enlarged scale taken along line 9—9 of Fig. 7;

Fig. 10 is a fragmentary horizontal section in an enlarged scale taken along line 10—10 of Fig. 7;

Fig. 11 is a fragmentary horizontal section in an enlarged scale taken along line 11—11 of Fig. 7;

Fig. 12 is a plan view in a reduced scale of the upper part of the camera;

Fig. 13 is a side view in elevation partly broken away and sectioned, of the upper part of a camera equipped with a modified form of focusing device of the type shown in Figs. 6-12;

Fig. 14 is a side view in elevation of a camera equipped with a focusing device embodying my invention in another alternative form;

Fig. 15 is a fragmentary rear view in elevation thereof; and

Fig. 16 is a fragmentary plan view of the same.

Referring to Figs. 1-5 of the drawings, 20 designates a folding camera comprising a main frame 21, adapted to hold a photo-sensitized element in any well known manner, a lens holding frame 22 carrying a lens 23, connected to the main frame by the bellows 24, and a platform 25 which when extended as shown forms a support along which slides the lens holding frame, and when folded against the front of the main frame forms a closure therefor.

Said camera being of a conventional type, no further description is deemed necessary, except that it will be here noted that customarily in such cameras, as clearly shown in Figs. 1-5, the platform 25 is retained in its horizontal position by two side sliding and swinging arms such as shown at 26, the lower end of each arm being pivotally connected to a bracket 27 secured to the platform as by screws 28.

The focusing device shown in connection with said camera comprises a stationary tubular member 29 equipped at the rear with a sight piece 30, and a tubular member 31 telescopically mounted at the front end of stationary member 29 and extensible in relation thereto.

Said extensible member carries a lens 32 that I will refer to as a viewing lens, whereas lens 23 is a working lens, both lenses being of equal focus.

In proximity of its front end, member 29 is provided at its inner side with a longitudinal slot 33 from which projects a bracket 34 attached to said member 31 by means of screws 35. Slot 33 is longer than the attaching portion of said bracket, so that extensible member 31 will be allowed a certain amount of axial movement with respect to stationary member 29.

On bracket 34 is fixed a plate member 36 having a notched extension 37 adapted to be inserted over the side of lens holding frame 22, as shown in Figs. 1, 2, and 3.

Plate member 36 is provided with a longitudinal slot 38 and is secured to bracket 34 by means of screws 39 projecting through said slot. The length of slot 38 is such as to permit a certain amount of adjustment of plate member 36 with respect to bracket 34.

In proximity of its rear end, stationary member 29 is provided with a focusing screen consisting of a disc of ground glass which is not shown in Figs. 1-5 but is similar to that which will be described in connection with Figs. 6-12. In order to understand this description it will be sufficient to state that said focusing screen is disposed at the same or on a parallel vertical plane with the face of the sensitized element inserted within main frame 21. There is therefore a definite distance relation between the plane of the sensitized element and the plane of the focusing screen carried by member 29, and the relative position of slot 33 bracket 34 and plate member 36 is such that the distance between the planes of the two lenses substantially corresponds to the distance between the plane of the sensitized element and the plane of the focusing screen at the rear.

Stationary member 29 is secured onto the camera by means of a bracket 40 carrying said member, said bracket having a slot 41 adapted for insertion over the edge of platform 25 and a screw 42 for clamping it in position. The correct position of the stationary member can be effected by setting its bracket 40 on the patform in correspondence of some suitable marking or reference point. In practice, I prefer to arrange bracket 40 in such a distance relation from the focusing screen, that in order to insure proper positioning of the stationary member, it will be sufficient to place the bracket 40 in a position along the edge of platform 25 where it abuts against bracket 27 already provided in the camera, as Fig. 5 clearly shows.

The limited amount of adjustment allowed by slot 38 is for the purpose of compensating small differences such as may exist between lens mountings of various cameras of the same type. It will be understood that, the attachment being made for a definite type of camera, slot 33 is so arranged with respect to the viewing lens and the focusing screen that when the lens holder is first moved to infinity previous to effecting the focusing adjustment thereof, bracket 34 remains in proximity of the rear end of slot 33; said slot being long enough to allow the necessary focusing adjustment called for by the focusing of the working lens of the camera.

An ideal condition for the proper placement for the focusing device is of course one where the focusing screen remains on the same plane with the sensitized element within the camera and the viewing lens is on the same plane with the working lens. In practice it is not always possible to realize this condition, but a small front to rear displacement of the planes of the focusing screen and viewing lens with respect to the planes of the sensitized element and working lens does not in ordinary practice affect the focusing operation as long as the relative focal distances are the same.

The arrangement just described is in the form of a detachable attachment which should be removed from its operative position when the camera is folded up. My invention can also be carried into practice in the form of a fixed addition to the camera. A very convenient arrangement embodying this idea, in which the focusing device is mounted directly on top of the camera main frame, is illustrated in Figs. 6-12.

In the same, 43 designates the main frame of the camera, 44 the lens holding frame and 45 the bellows, extending therebetween. The camera is of the folding type and is provided with a pivotally mounted platform 46, held in its extended position by side arms 47.

The focusing device, which is mounted directly on the top 48 of the main frame, comprises a tubular member 49 pivotally mounted at 50 on a base plate 51, fixed on the top 48, and a tubular member 52, telescopically mounted within tubular member 49 and extensible in relation thereto.

Member 49 carries a focusing screen 53, mounted on a plane which coincides with or is parallel to and in relative proximity of the plane of the sensitized element held within frame 43.

At the rear, tubular member 49 is also preferably equipped with a sight piece 54, carrying a magnifying lens 55, in order to enhance the clarity of vision of the image projected upon the focusing screen.

At its forward end, telescopic member 52 carries a viewing lens 56, which, as explained, is mounted so as to be at a focal distance from the focusing screen substantially equivalent to the focal distance of the working lens 57, from the sensitized element at the rear.

The axial movement of telescopic member 52 is effected by operatively associating said member with the lens holding frame 44 of the camera. A simple and effective arrangement to this end is shown in the drawings, where it is seen that an angle plate 58 is mounted on top of the lens holding frame, said angle plate having a forwardly extending portion 59 provided with an open end transversely directed notch 60.

The telescopic member 52, is provided with a radially extending pin 61, having a head 62, adapted to be inserted within notch 60, and to interlock with extension 59, said head being preferably equipped with a rubber sleeve 63 as shown in Fig. 11.

The telescopic member is moved in or out of engagement with angle plate 58, by a partial rotatory movement of said member 52, about its own axis, as will be understood.

When telescopic member 52 is in its retracted position, pin 61 may be inserted through slot 64, provided at the end of tubular member 49, said slot being L-shaped and having a longitudinal portion 65 at its open end, and a closed end portion 66, bent at right angles thereto from the inner end of said longitudinal portion 65, as shown in dotted lines in Fig. 10.

Said closed portion 66 of slot 64 extends circumferentially of tubular member 49, a distance sufficient to allow an angular displacement of member 52, to a point where a pin 61 reaches a position such as shown at 61' in Fig. 8, where the lower end of said pin remains slightly higher than the top 48, of the camera main frame. When member 52 has been retracted, and pin 61 has been caused to interlock with slot 64 by moving it to the position 61', the focusing device can be turned at right angles to its working position to the position shown in dot and dash lines at 49' in Fig. 12, where the device extends over the top of the camera transversely thereof.

The device may be held in its correct operative or inoperative position by means of a spring actuated ball such as shown at 67 in Fig. 7, said ball being pressed within a depression 68, provided in the base 69 of member 49, by a spring 70, sunk into base plate 51.

The device thus forms a permanent addition to the camera and can be quickly set in operative or inoperative position whenever desired. In focusing the camera the eye is applied to the rear of the focusing device, as will be understoood. In order to facilitate the operation of the camera and enable the user to hold it without extending his arms upwardly to an uncomfortable degree, it may be preferable, in certain cases, to provide a focusing arrangement permitting of holding the camera at about shoulder height. An arrangement fulfilling this requirement is shown in Fig. 13, where 71 designates the main frame of a camera, 72 the axially stationary member pivotally mounted at 73 on top of the camera frame in the manner described in connection to Figs. 6–12, and 74 is a telescopically mounted member connectable by means of pin 75 to angle plate 76 carried by the lens holding frame 77.

Like in the previous case the focusing screen 78 is provided at the rear end of member 72, and a sight piece 79 extends from said rear end at a forwardly inclined angle.

Within the sight piece and directly at the rear of the focusing screen 78 is mounted a mirror 80 inclined at an angle exactly one half of the angle of inclination of the outer end 81 of the sight piece, the axes of member 72 and part 81 of the sight piece, meeting at the center of the mirror.

By virtue of this construction when the user looks through the magnifying lens 82 mounted at an upper end of the sight piece, he sees the reflection of the image appearing on the focusing screen, and he can do this by slightly lowering his head to bring his eye close to the sight piece.

It is also possible to shorten the length of the focusing device and still obtain the condition necessary to its operation, that is, a focal distance of the viewing lens with respect to the focusing screen equal to the focal distance of the working lens with respect to the sensitized element. An arrangement to this end is shown in Figs. 14–16, in which 83 designates the camera frame, 84 the stationary member of the focusing device, and 85 the telescopic member extensible therefrom.

The length of the stationary member is broken into a lower section 86 and an upper section 87 optically related thereto by a system of prisms, one prism 88 being mounted opposite the rear end of section 86, and another prism 89 being mounted opposite the front end of section 87, said prisms being so arranged that rays of light reaching the inside of section 86 through the viewing lens 90, carried by the outer end of telescopic member 85, will be directly reflected onto the focusing screen 91 mounted in proximity of the rear end of section 87.

By virtue of this arrangement the focal distance of the viewing lens 90, with respect to the focusing screen 91, is represented by the distance between the plane of the viewing lens and the point where its axis strikes the lower reflecting face 92 or prism 88, plus the distance between the plane of the focusing screen and the point where its axis strikes the upper reflecting face 93 of prism 89 plus the distance between the center of the upper reflecting face 94 of prism 88 and the center of the lower reflecting face 95 of prism 89, plus the vertical distance between the axis of the viewing lens and section 86 and the axis of the focusing screen and section 87. Thus by making said focal distance equivalent to the focal distance of the working lens of the camera from the plane of the sensitized element the actual distance separating the plane of the viewing lens from the plane of the focusing screen will be considerably less.

The operative connection between the lens holding frame 96 of the camera and the telescopic member 85 is effected by means of connecting rod 97 having its rear end pivotally mounted at 98 to the end of member 85, and having a hook shaped outer end 99 adapted to engage a pin 100 projecting laterally of lens holding frame 96, said hook shaped end of rod 97 being held in position by a clamping nut 101.

Pin 100 is preferably made adjustable along a vertical slot 102 in order to effect such small initial adjustments of the focal distance of the focusing device as may be required.

From the foregoing it will be seen that I provide a novel and convenient arrangement of focusing device which may be added to an ordinary camera either in a detachable or permanently attached form. While the device is primarily intended for use in connection with cameras of the extensible type, it is obvious that by omitting the extensible member the device may be made in a simplified form for use in connection with cameras of the non-extensible type; although it must be observed that in a majority of cases, in connection with cameras of the less expensive types, the finder, with which all cameras are equipped, will be found sufficient for ordinary purposes.

The constructional details of my invention may vary to a certain extent from those shown without departing from the inventive idea; the drawings should be understood as being intended for illustrative purposes only and not in a limiting sense. I accordingly reserve the right to carry my invention into practice in all those ways and manners which may enter, fairly, into the scope of the appended claims.

I claim:

1. A focusing device adapted to be mounted onto a camera comprising a sensitized element receiving main frame, a working lens, a lens carrying frame adjustable towards and away from said main frame, and a platform supporting said lens carrying frame, said focusing device comprising a focusing screen carrying tubular member, a focusing screen mounted therein, a viewing lens carrying tubular member telescopically mounted with respect to said focusing screen carrying member, both lenses being of equal focus, a bracket adapted to interlock with said lens carrying frame, extending from said viewing lens carrying member, and a bracket extending from said focusing screen carrying member adapted to be secured onto said platform, at a predetermined position insuring a focal distance of said viewing lens with respect to the focusing screen, corresponding to the focal distance of said working lens with respect to the sensitized element carried by the main frame.

2. A focusing device adapted to be mounted onto a camera comprising a sensitized element receiving main frame, a working lens, and a lens carrying frame adjustable towards and away from said main frame, said focusing device comprising a focusing screen carrying tubular member attachable to a stationary part of said camera, a focusing screen carried by said member, a magnifier carried by said member at the rear thereof, the axis of said magnifier being upwardly inclined with respect to the axis of said tubular member, a viewing lens carrying tubular member telescopically mounted with respect to said focusing screen carrying member, a viewing lens mounted within said viewing lens carrying member, means for operatively associating said viewing lens carrying member with said lens carrying frame, and a member reflecting into said magnifier the light rays projected by the viewing lens within said tubular members, onto said focusing screen.

3. The combination, with a camera comprising a sensitized element receiving main frame, a working lens, and a lens carrying frame adjustable towards and away from said main frame, of a focusing device comprising a focusing screen carrying tubular member pivotally mounted on top of said main frame so as to be movable from an operative longitudinally directed position to an inoperative position at right angles thereto, a viewing lens carrying tubular member telescopically mounted with respect to said focusing screen carrying member, means for detachably connecting said viewing lens carrying member to said lens carrying frame, and means for retaining said viewing lens carrying member in its retracted position.

4. The combination, with a camera comprising a sensitized element receiving main frame, a working lens, and a lens carrying frame adjustable towards and away from said main frame, of a focusing device comprising a focusing screen carrying tubular member pivotally mounted on top of said main frame so as to be movable from an operative longitudinally directed position to an inoperative position at right angles thereto, a viewing lens carrying tubular member telescopically mounted with respect to said focusing screen carrying member, means for detachably connecting said viewing lens carrying member to said lens carrying frame, and means interlocking with and retaining said focusing screen carrying member both in its operative and its inoperative position.

5. The combination, with a camera comprising a sensitized element receiving main frame, a working lens, and a lens carrying frame adjustable towards and away from said main frame, of a focusing device comprising a focusing screen carrying tubular member pivotally mounted on top of said main frame so as to be movable from an operative longitudinally directed position to an inoperative position at right angles thereto, a viewing lens carrying tubular member telescopically mounted with respect to said focusing screen carrying member, means for detachably connecting said viewing lens carrying member to said lens carrying frame, and means interlocking with and retaining said focusing screen carrying member both in its operative and its inoperative position, said focusing screen carrying member having means for interlocking with and retaining said viewing lens carrying member in its retracted position.

ALEXANDER C. PARLINI.